United States Patent [19]

Raidel

[11] Patent Number: 4,762,337
[45] Date of Patent: Aug. 9, 1988

[54] SUSPENSION ASSEMBLY WITH STUB BOLSTER HANGER ASSEMBLY

[76] Inventor: John E. Raidel, Rte. 1, Box 400-M, Springfield, Mo. 65804

[21] Appl. No.: 16,542

[22] Filed: Feb. 19, 1987

[51] Int. Cl.⁴ ............................................. B60G 11/26
[52] U.S. Cl. .................................... 280/688; 280/711
[58] Field of Search .............. 280/683, 688, 702, 711, 280/713, 724, 725, 685, 143

[56] References Cited
U.S. PATENT DOCUMENTS 3,049,359  8/1962  Geyer ................................. 280/725
4,267,896  5/1981  Hendricksen ....................... 280/725
4,541,653  9/1985  Raidel ................................. 280/702

Primary Examiner—Ross Weaver
Attorney, Agent, or Firm—Rogers, Howell, Moore & Haferkamp

[57] ABSTRACT

A suspension assembly having a hanger with a stub bolster beam. Gusset bracing and a cross channel member of small cross section provide strength and rigidity and accommodate large vehicle components in the area of the suspension assembly.

8 Claims, 2 Drawing Sheets

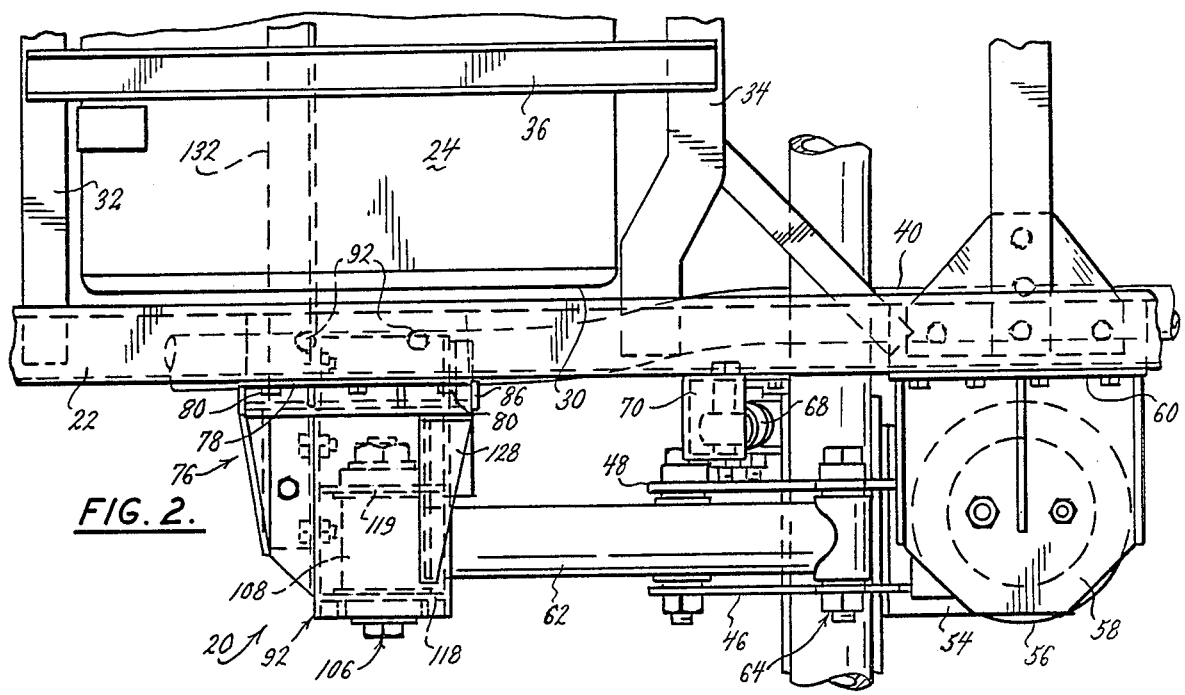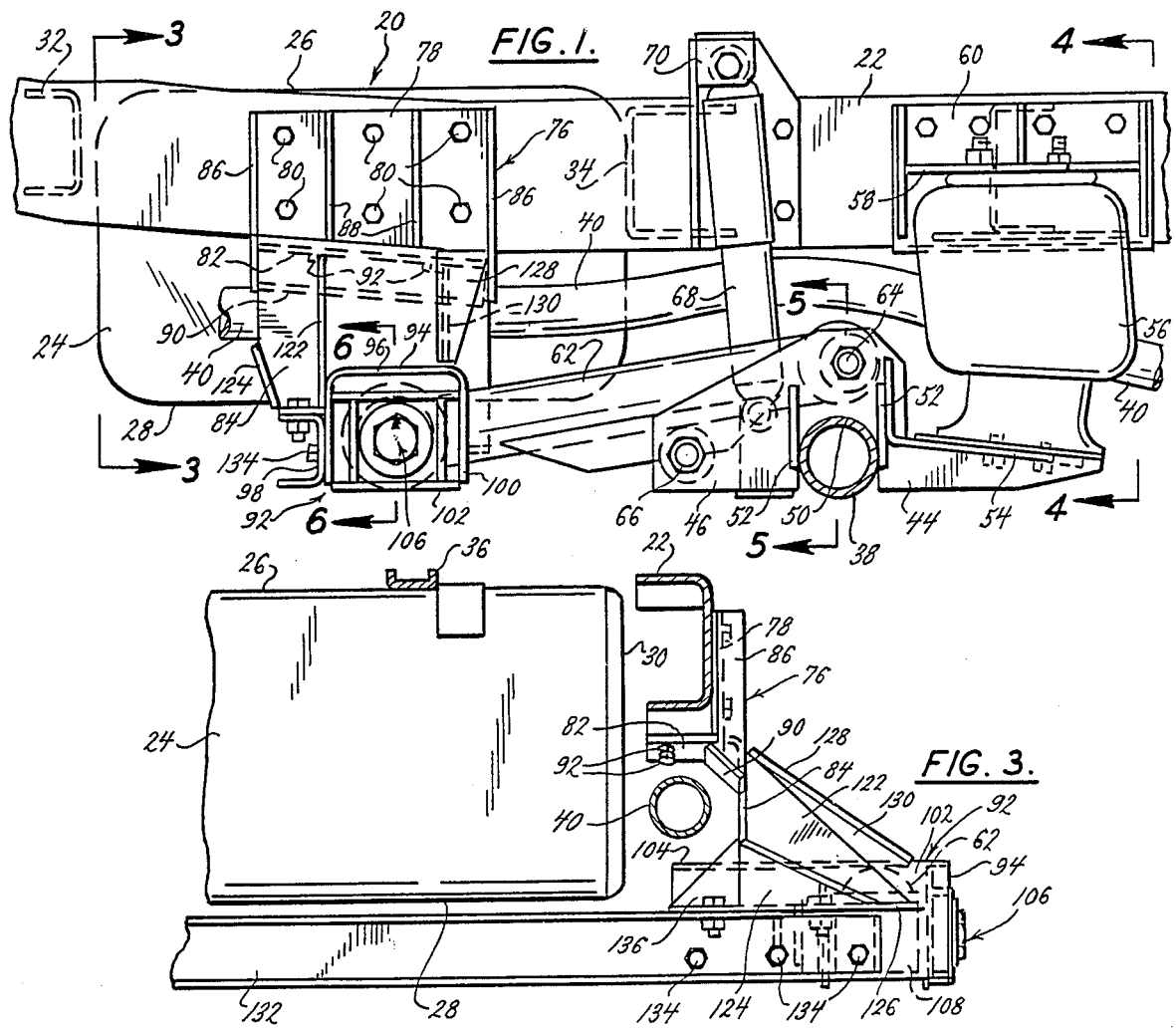

SUSPENSION ASSEMBLY WITH STUB BOLSTER HANGER ASSEMBLY

BACKGROUND OF THE INVENTION

This invention relates to a suspension assembly and particularly to a suspension assembly for installation on a vehicle that has components interfering with the normal location of some parts of a suspension assembly. A special stub bolster type hanger assembly accommodates the vehicle components while providing strength and rigidity.

Some vehicles are free of vehicle components that would interfere with the normal location of suspension parts. These vehicles may also have a chassis that is fully braced with cross members in the area of the suspension or that has unimpeded areas between side rails so that cross member bracing can be added to make the chassis stronger and more rigid in the area of the suspension assembly. Other vehicles such as those to which this invention is directed, are not so accommodating.

A particular problem can be presented if the vehicle has a component or components, such as a fuel tank, substantially filling the space between the chassis side rails in the area where the suspension assembly hanger is to be connected to the side rail. If the fuel tank is large, it may block a significant area between the side rails so that in the area of the suspension hanger, the vehicle can have no reinforcing cross members.

Likewise, if the fuel tank is optimized to maximum size, it may project into the area where a normal bolster beam might project when extending between hangers on opposite sides of the vehicle. This further compounds the problem of how to make the suspension system sufficiently strong and rigid without relocating the fuel tank, which is expensive or may not be possible. In addition, an exhaust pipe typically must traverse a generally longitudinal path and the large fuel tank narrows the choice of areas where the exhaust pipe can be located.

SUMMARY OF THE INVENTION

This invention attacks the installation problems discussed above by providing a hanger assembly having a narrow profile skirt with a stub bolster projecting laterally outwardly from the hanger skirt. A torque beam is mounted on the stub bolster by an eccentric bolt and bushing assembly and the torque beam is connected to an axle seat assembly with an air spring mounted between the axle seat assembly and the chassis. The axle seat assembly is also connected to the axle and thus a wide range of heavy loads are applied through the torque beam and bushing assembly to the stub bolster. This creates moments and stresses that are particularly concentrated in the area where the stub bolster joins the hanger skirt.

To provide adequate strength, the hanger assembly includes several gusset plates welded between the skirt and the stub bolster. Preferably there is a short inboard section of the stub bolster to which other gusset plates, welded to the inside wall of the skirt, are also welded. Still further, a cross channel, of much smaller cross section than that of the stub bolster, is connected between the stub bolster and a like stub bolster on the opposite side of the vehicle. There are connections between the cross channel member and the stub bolster that span a significant transverse portion of the stub bolster, thereby adding to the reinforcement against moments supplied by the torque beam.

To compound the installation problems, the vehicle typically has an exhaust pipe that passes through the area of the hanger assembly. This hanger assembly design of this invention provides an area between the skirt and tank and between the hanger mounting bracket and the stub bolster inboard section through which the exhaust pipe can pass.

BRIEF DESCRIPTION OF THE DRAWINGS

FIG. 1 is a side elevation view of the suspension assembly;

FIG. 2 is a top plan view of the suspension assembly;

FIG. 3 is a view in section taken along the plane of the line 3—3 of FIG. 1;

DETAILED DESCRIPTION OF PREFERRED EMBODIMENT

Figure 5:
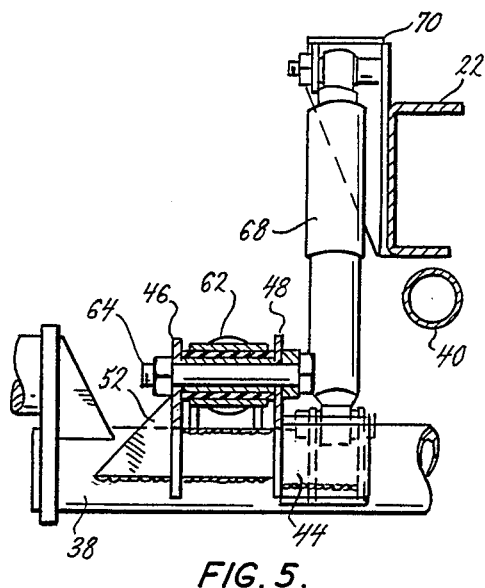
FIG. 5 is a view in section taken along the plane of the line 5—5 of FIG. 1.
Figure 4:
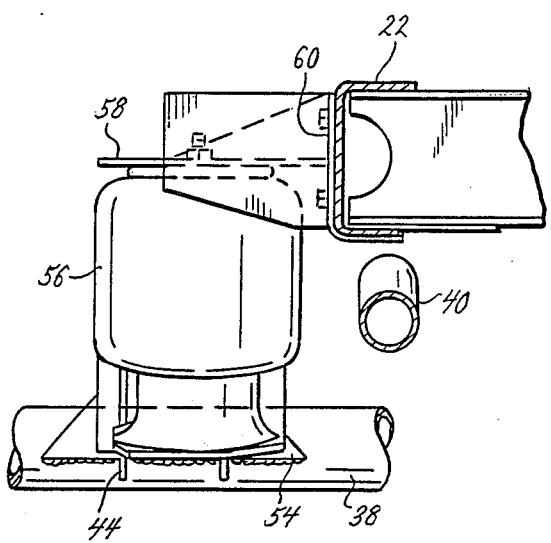
FIG. 4 is a view in section taken along the plane of the line 4—4 of FIG. 1.

This suspension assembly 20 is designed for installation on a vehicle that has a chassis with a right side rail 22, and it will be understood that there is a left side rail similar to the rail 22 and a left suspension assembly similar to the suspension assembly 20 and installed on the opposite side of the vehicle. The vehicle is a kind that has components, such as a large fuel tank 24 that would be at least partially occupied by a conventional area suspension assembly. The fuel tank 24 has a top 26 located at about the same elevation as the top of the side rail 22, a bottom 28 that is substantially below the side rail 22, and sides 30 that are close to the side rail 22 (and its side rail counterpart on the opposite side of the vehicle).

The fuel tank 26 is supported by relatively lightweight framing members 32, 34 and 36 that are connected between the right side rail 22 and its left side rail counterpart. Forward of the tank 24, the vehicle has an axle 38 that, in the embodiment described and illustrated, is a tag axle with a drop section. The vehicle also has an exhaust pipe 40 that extends generally longitudinally and that must be accommodated by the suspension assembly 20.

For various reasons, including better stability and better ride quality, it is desirable that the suspension assembly 20 be outboard of the side rail 22. Thus, the suspension assembly 20 includes an axle seat 44 incorporating parallel side plates 46 and 48 that have cutaway sections 50 where they are welded to the axle 38. Gusset plates 52 are welded to the side plates 46 and 48 and to the axle 38 to make the connection more rigid. The axle seat 44 carries a lower support plate 54 and an air spring 56 is mounted between the support plate 54 and an outwardly projecting plate 58. The plate 58 is welded to a bracket 60 that is bolted to the side rail 22.

The suspension assembly 20 further includes a torque beam 62 that is connected between the plates 46 and 48 by two bushing assemblies 64 and 66. A shock absorber 68 is connected between the axle seat 44 and a bracket 70 that is welded or otherwise connected to the side rail 22.

The hanger assembly 76 for the suspension assembly 20 includes a bracket plate 78 fastened by bolts 80 to the side rail 22. The bracket plate 78 is welded to a transverse flange 82 formed at the upper end of a vertical skirt 84. Side ribs 86 and central ribs 88 are also welded between the bracket plate 78 and the flange 82, and a diagonal plate 90 is welded between the flange 82 and the vertical skirt 84 to provide further reinforcement. Bolts 92 connect the flange 82 to the side rail 22.

A stub bolster beam 92 is supported by the hanger skirt 84. The stub bolster beam 92 is formed with an inverted U-channel 94 having a top wall 96 and side walls 98 and 100. A bottom plate 102 is welded to the bottom edges of the side walls 98 and 100 and these components combine to define a section 102 of the stub beam 92 that is outboard of the hanger skirt 84 and another section 104 that is inboard.

Figure 6:
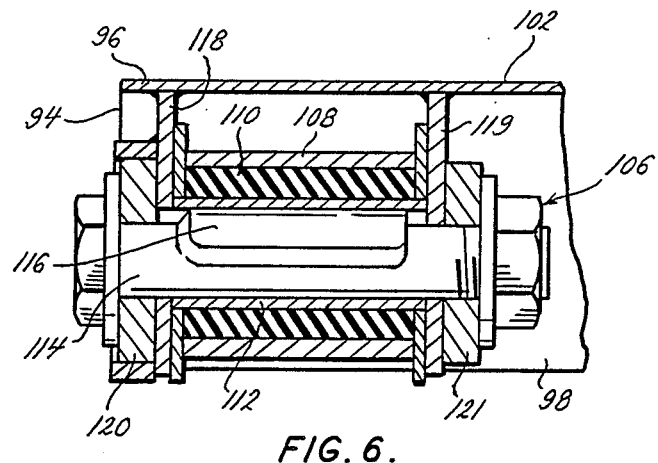
FIG. 6 is an enlarged view in section taken along the plane of the line 6—6 of FIG. 1.

The outboard section 102 supports an eccentric bolt and bushing assembly 106. The torque beam 62 has its forward end formed with a cylindrical sleeve 108 that functions as the outer housing of the eccentric bolt and bushing assembly 106. As FIG. 6 illustrates, the eccentric bolt and bushing assembly 106 includes the sleeve 108 journalled about a resilient bushing member 110 that in turn is mounted on an inner sleeve 112. The inner sleeve 112 is mounted on a bolt 114 that has an eccentric 116. The bolt 114 is supported between plates 118 and 119 that are welded to the channel member 94 and between blocks 120 and 121. The eccentric bolt 114 provides an adjustment of axle alignment of the axle 38 in a manner known in the art.

The outboard secton 102 of the stub bolster beam 92 allows outboard mounting of the torque beam 62, as particularly shown in FIG. 2. This results in a wide variety of heavy loads applied to the stub bolster beam 92 creating applied moments that are the greatest at the area where the stub bolster beam 92 is joined to the vertical hanger skirt 84. This variety of loads might be resisted by bracing within the area inboard of the side rail 22, but the fuel tank 24 fills much of that area. This invention provides that strength needed to support the loads and moments applied against the stub bolster beam 92.

The outer section 102 of the stub bolster beam 92 is reinforced with gusset plates 122 and 124 with the plate 122 being welded to the skirt 84 and the side of the channel member 94 and the plate 124 being welded to the skirt 84 and to a lateral plate 126. In addition, a brace 128 is welded to the upper edge of another gusset plate 130, the gusset plate 130 being welded to both the skirt 84 and the top of the channel member 94.

To further stabilize and strengthen the stub bolster beam 92, there is a cross channel member 132 connected by transversely spaced bolts 134 to the stub bolster beam outboard section 102. The transversely spaced bolt connections 134 strengthen the stub bolster beam 92 against moments supplied by the torque beam 62. The cross channel member 132 also stabilizes the hanger 76 by connecting it to the hanger on the opposite side of the vehicle.

The cross channel member 132 is much smaller in cross section than is the stub bolster beam 92 so that the cross channel member 132 can clear the bottom 28 of the fuel tank 24. Yet, the cross channel member 132 cooperates with the other bracing that has been described to provide reinforcement against vertical and horizontal moments applied to the stub bolster beam 92 and to stabilize the hanger skirt 84. Still further strength is provided by one or more small gusset plates 136 welded to the inboard side of the hanger skirt 84 and to the inboard stub bolster section 104.

INSTALLATION AND OPERATION

Although after installation, this suspension assembly includes a hanger assembly that is integral between the two sides of the vehicle, and nevertheless accommodates the large amount of space that is taken up by the fuel tank 24, the installation of the suspension assembly can be done readily a wrench. Thus, the hanger assembly 76 can be installed by connecting the bolts 80. Then the cross channel member 132 is easily installed by installing the bolts 134. With the axle seat 44 welded to the axle, the torque beam 62 can be installed by installation of the bushing assemblies, 64, 66 and 106.

With the laterally outwardly projecting stub bolster beam 92, the entire suspension assembly 20 can be installed outboard for better stability and drive quality. Strength and rigidity are provided by the various reinforcing gusset plates and by the cross channel member 132. Even though the cross channel member 132 is of relatively small cross sectional area, it cooperates with the reinforcing gusset plates to provide the necessary resistance to loads and bending moments applied to the stub bolster beam 92.

There are various changes and modifications which may be made to the invention as would be apparent to those skilled in the art. However, these changes or modifications are included in the teaching of the disclosure, and it is intended that the invention be limited only by the scope of the claims appended hereto.

I claim:

1. A suspension assembly for a vehicle having an axle and a chassis including a side rail at a side of the vehicle and a like side rail at the opposite side of the vehicle, and having at least one vehicle component occupying a large area extending below the chassis and between the side rails, comprising a torque beam and axle seat assembly, means for connecting the torque beam and axle seat assembly to the axle, spring means connected between the chassis and the torque beam and axle seat assembly, a sleeve on the torque beam and axle seat assembly for mounting on a bushing, a hanger and stub bolster assembly including a verticle skirt, means for connecting the verticle skirt to the side rail with a lower portion of the skirt positioned below the side rail, a stub bolster beam connected on a transverse axis to the lower portion of the skirt at an elevation that affords minimum ground clearance of the suspension system and consequently locates the upper portion of the stub bolster beam higher than the lower portion of said at least one vehicle component, the stub bolster beam having an outboard section extending transversely outboard from the skirt and having an inboard end that terminates the stub bolster outboard of said at least one vehicle component, reinforcing means connected between the skirt and the stub bolster beam for increasing the ability of the hanger and stub bolster assembly to support loads applied to the stub bolster beam, said reinforcing means including a cross channel extending transversely between the stub bolster and a like stub bolster beam on the opposite side of the vehicle and having a cross section of less height than that of the stub bolster and having a length that locates opposite end portions of the cross channel member adjacent transverse areas of the stub bolster beams, means for connecting the end portions of the cross channel member to said transverse areas of the stub bolster beams whereby the stub bolster beams are reinforced against forces and moments applied by the torque beam and axle seat assembly, the uppermost extension of the cross channel member being located below and clearing said at least one vehicle component, the height of the cross channel member positioning its lower side above said minimum ground clearance, and a bushing assembly supported on a transverse axis by the outboard section of the stub bolster beam, the bushing assembly including an annular elastomeric bushing member, and the sleeve on the torque beam and axle seat assembly being mounted on the elastomeric bushing member thereby providing the outer bushing housing for the bushing assembly connecting the torque beam and axle seat assembly to the hanger and stub bolster assembly.

2. The suspension assembly of claim 1 wherein the bushing assembly is contained within the outboard section of the stub bolster beam and includes a bolt having an eccentric cam shank, the elastomeric bushing member being mounted on the eccentric cam shank, whereby rotation of the bolt adjusts the longitudinal position of the axle.

3. The suspension assembly of claim 1 wherein the stub bolster beam has an inboard section extending between its inboard end and the skirt and the reinforcing means includes plate means connected between the skirt and the inboard section, and wherein the transverse dimension of the skirt is narrow and the span between the skirt and said at least one vehicle component as well as the span between the side rail and the inboard section define an area large enough to receive a vehicle exhaust pipe through it.

4. The suspension assembly of claim 1 wherein the elastomeric bushing member is at least four inches wide and 2½ inches in outside diameter.

5. The suspension assembly of claim 1 wherein the reinforcing means includes plates welded to the outboard side of the skirt and to the upper side of the outboard section of the stub bolster beam.

6. The suspension assembly of claim 1 wherein the means for connecting the vertical skirt to the side rail includes vertical and horizontal components for bearing against the outer side and bottom of the side rail.

7. The suspension assembly of claim 1 wherein the stub bolster beam is rectangular in cross section.

8. The suspension assembly of claim 7 wherein the cross channel is connected to the forward side of the stub bolster beam.

* * * * *